United States Patent [19]

Moffett

[11] Patent Number: 4,783,025
[45] Date of Patent: Nov. 8, 1988

[54] EMERGENCY MEDIAL SERVICE-INTERIOR FOR AIRCRAFT

[75] Inventor: James D. Moffett, Christiana, Pa.

[73] Assignee: Atlantic Aviation Corporation, New Castle, Del.

[21] Appl. No.: 46,215

[22] Filed: May 5, 1987

[51] Int. Cl.$^4$ .................. B60P 3/26; B64D 11/00
[52] U.S. Cl. ...................... 244/118.5; 296/19
[58] Field of Search ............. 244/118.1, 118.2, 137.1, 244/137.2, 122 R, 118.5, 118.6; 296/19, 20; 187/9 R, 9 E

[56] References Cited

U.S. PATENT DOCUMENTS

| | | | |
|---|---|---|---|
| 1,284,936 | 11/1918 | Shine | 296/19 |
| 2,415,655 | 2/1947 | Reinert | 187/9 R |
| 3,204,998 | 9/1965 | Stollenwerk | 296/19 |
| 4,178,032 | 12/1979 | Hone | 244/118.1 |

FOREIGN PATENT DOCUMENTS 2426608  1/1980  France ................ 244/118.6

Primary Examiner—Galen Barefoot
Assistant Examiner—Rodney Corl
Attorney, Agent, or Firm—Pennie & Edmonds

[57] ABSTRACT

An apparatus for movably supporting a patient in an emergency medical system interiorly disposed in a helicopter is disclosed. First and second bearing blocks are slidably received on first and second upwardly extending elongated mounts. The mounts restrain any horizontal movement of the bearing blocks, while the bearing blocks cooperate to support a pallet assembly. Linear actuators are attached to the first and second bearing blocks to move each respective bearing block in a vertical direction independently of the other bearing block so as to raise and lower the entire pallet assembly or different ends thereof. Control means are provided for controlling the linear actuator and, thereby, the positions of each of the bearing blocks to permit selective positioning of the pallet assembly.

3 Claims, 3 Drawing Sheets

EMERGENCY MEDIAL SERVICE-INTERIOR FOR AIRCRAFT

The invention relates to emergency medical vehicles and in particular to an interior for helicopters used in such service.

In emergency medical service applications, helicopters have been used for emergency transfer and treatment of patients. Often such service involves transporting multiple patients and patients requiring immediate attention and treatment.

In the past the patient has been placed on a stretcher or litter has then been attached to the floor or a fixed bench within the helicopter. This construction however has proved unsatisfactory in several respects. First, in order for the EMS technicians or paramedics to work on the patient they must get down on the floor, creating an awkward working posture. Secondly, the interior space is cramped and the technicians or paramedics in their crouched position take up more space than they do when sitting upright.

SUMMARY OF THE INVENTION

In order to alleviate the problems described above as well as creating a more efficient environment within the helicopter, we have developed a new helicopter interior which places the patient at a more comfortable level for the paramedics to work as well as freeing up floor space within the EMS helicopter interior.

The new interior has a movable pallet on which a litter or stretcher can be placed. The pallet may be raised to a bench level permitting the paramedics to work comfortably on the patient while freeing up floor space beneath the pallet for equipment or an additional patient. The pallet is driven by two linear actuators so that the head and foot of the litter or stretcher may be raised or lowered independently of the other.

A further improvement of the interior is the provision of a dam around the floor perimeter. The dam is approximately three inches high and prevents corrosive bodily fluids leaking into other parts of the helicopter and damaging the components.

BRIEF DESCRIPTION OF THE DRAWING

The following description will be made with reference to the accompanying drawings wherein.

DESCRIPTION OF THE PREFERRED EMBODIMENT

Figure 1:
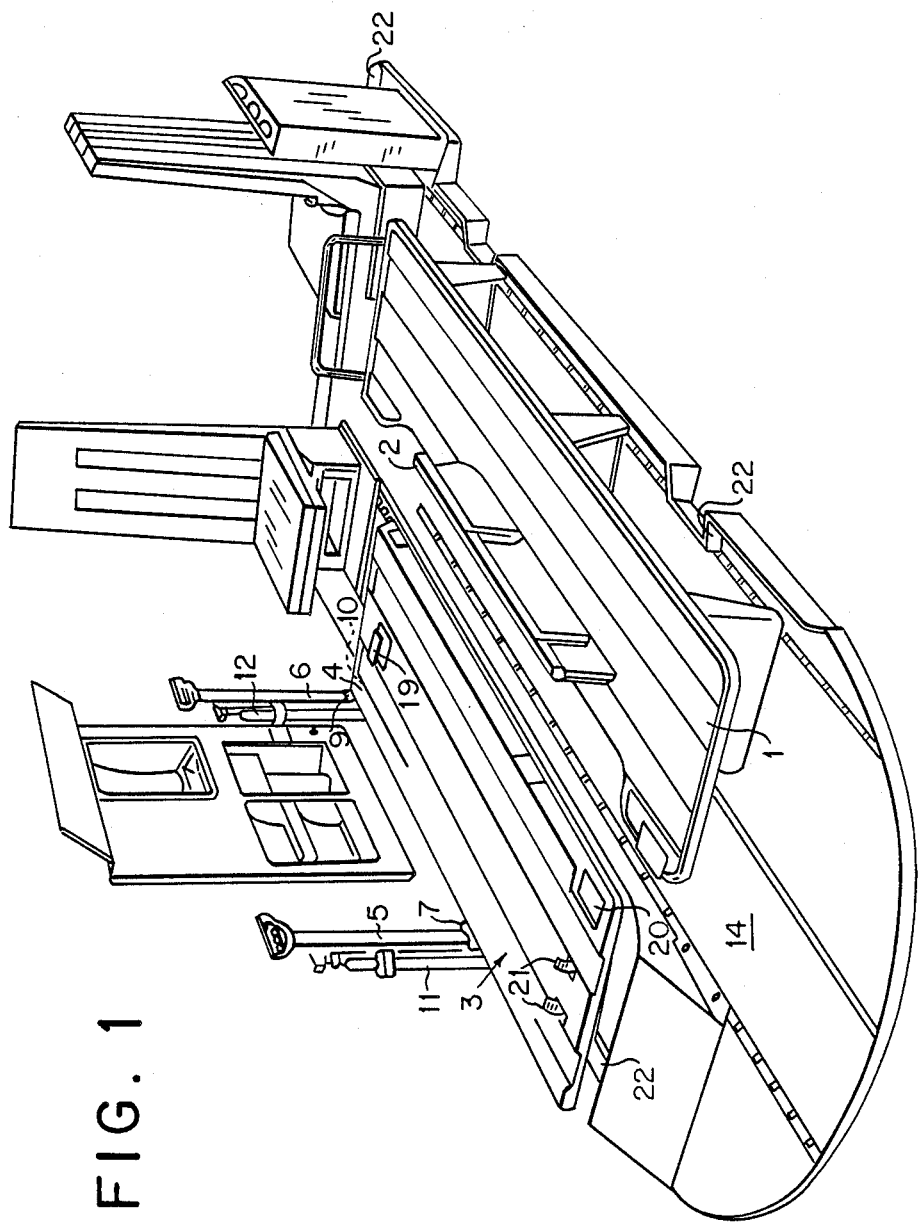
FIG. 1 is a perspective view of a helicopter interior incorporating the present invention.
Figure 2:
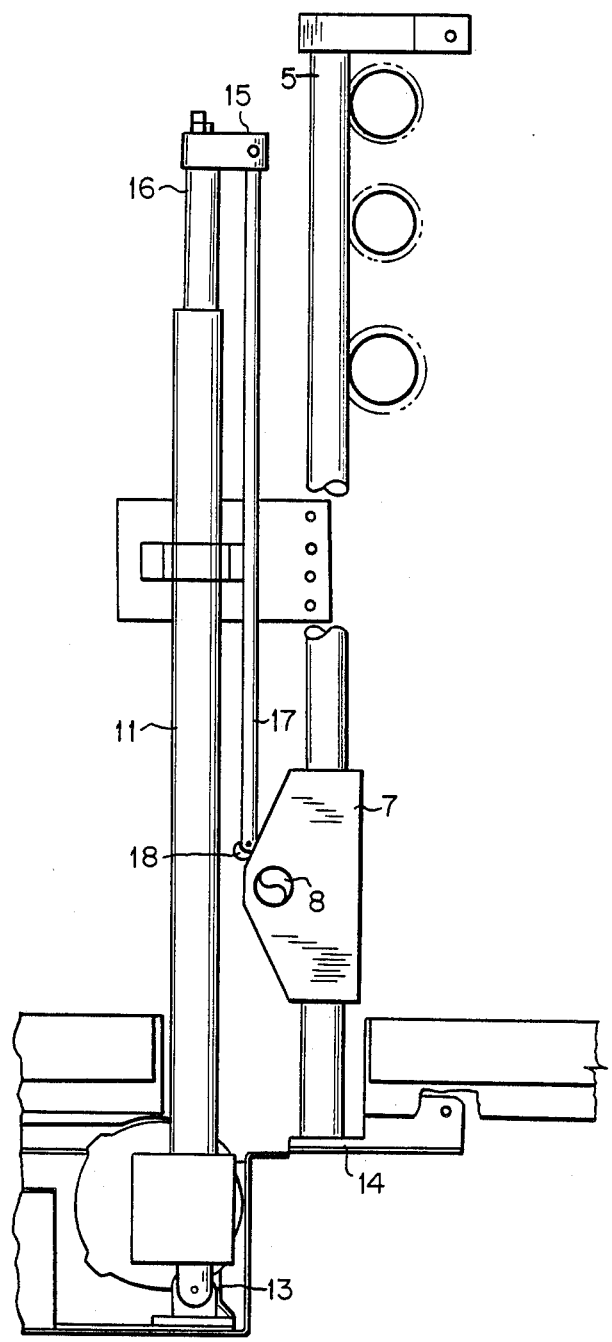
FIG. 2 is a front view of one of the linear actuators of the invention.
Figure 3:
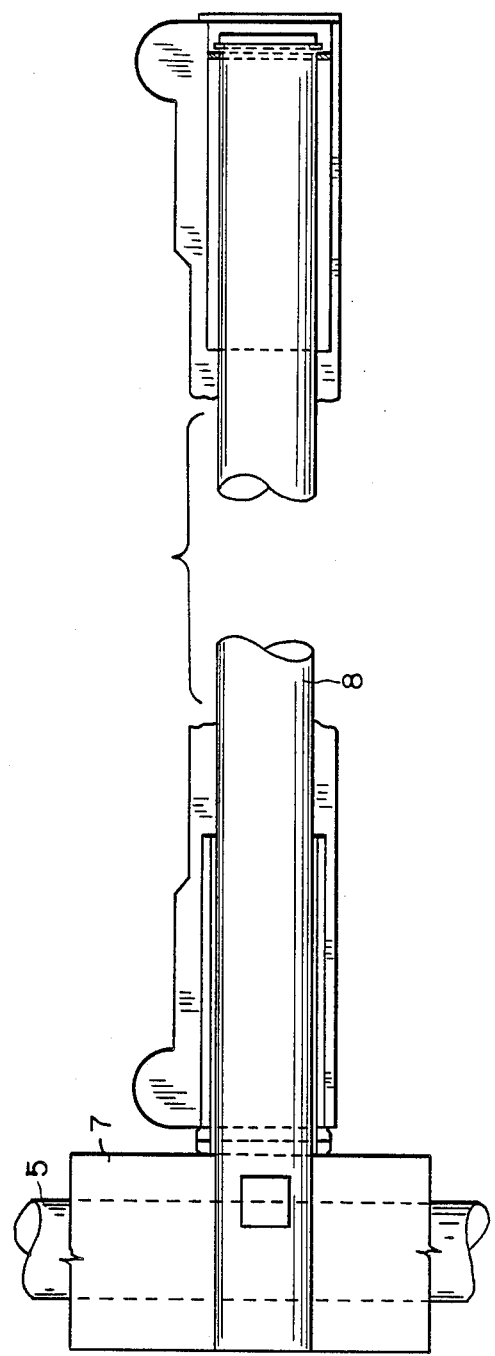
FIG. 3 is a side view of the pallet support of the invention.

Referring to FIG. 1, the overall helicopter interior is shown. A passenger bench 1 with backrest 2 extends along the starboard side. The passenger bench 1 also serves as a stretcher table through the provision of stretcher restraints (not shown) of known construction.

On the port side is positioned the assembly 3 of the patient support invention. The patient support assembly 3 includes a pallet 4 which is to slide on first and second mounts 5, 6. Although tubular mounts are shown, other forms of mounts can be used such as tracks with various cross sections. A first bearing block 7 is slidably received on first mount 5 and supports the pallet 4. The first bearing block 7 has a first arm 8 which extends from the first bearing block 7. First arm 8 is attached to and supports pallet 4. In a similar manner second bearing block 9 is slidably received on second mount 6. A second arm 10 extends from second bearing block 9 and is attached to and supports pallet 4. Pallet 4 is thus supported at the head by first bearing block 7 and arm 8; and at a point spaced from the foot of pallet 4 by second bearing block 9, second arm 10 and second mount 6.

In order to position pallet 4 along mounts 5 and 6, the assembly is provided with first and second linear actuators 11 and 12. First linear actuator 11 is mounted with its base end 13 below floor 14. Actuator 11 extends vertically and parallel to first mount 5. A linkage arm 15 extends perpendicularly from the end of shaft 16 of linear actuator 11. A linkage rod 17 is attached to linkage arm 15 and extends downward to bearing block 7. An eyebolt 18 extends from the bearing block 7 and is received in a cleavis at the end of linkage rod 17. A further actuator assembly is provided for second bearing block 9.

In operation a litter or stretcher is placed on pallet 4. A stretcher hook 19 receives and holds the head portion of the stretcher in a known manner. Handle 20 is rotated to engage stretcher keeper 21 to hold the foot of the stretcher. First and second linear actuators may now be activated to position the pallet 4 and thereby the stretcher. Activating first linear actuator 11 forces shaft 16 to rise vertically. This motion is translated through linkage arm 15 and linkage rod 17 to bearing block 7. Thus the bearing block is moved along mount 5. The two bearing blocks may be moved independently of one another by activating the linear actuators independently of one another. Thus the patient can be provided with a head raised or feet raised orientation.

Raising the pallet assembly provides the paramedics with a raised place to work. Thus some of the floor space beneath the pallet may be used to store equipment. That is, until it is desirable to lower the pallet. Similarly the pallet may be raised and a second patient placed under the pallet assembly.

To further improve the helicopter's EMS interior, an improved floor is used. The floor has a dam 22 about its perimeter. The dam 22 is approximately three inches tall and prevents bodily fluids from leaking into the workings of the helicopter.

I claim:

1. An apparatus for movably supporting a patient in an emergency medical system interiorly disposed in helicopter comprising:
   (a) first and second upwardly extending elongated mounts for restraining horizontal movement of bearing blocks received thereon;
   (b) a first bearing block slidably received on said first mount and a second bearing block slidably received on said second mount, said bearing blocks cooperating to support a pallet assembly;
   (c) a pallet assembly attached to and supported by said first and second bearing blocks;
   (d) linear actuators attached to said first and second bearing blocks, said linear actuators including an operating shaft which moves vertically so as to move each bearing block along its mount independently of the other bearing block to raise and lower said pallet assembly;
   (e) a linkage arm extending horizontally from said operating shaft;

(f) a linkage rod extending vertically between said linkage arm and said bearing block, said linkage rod being associated with said linkage arm and said bearing block, so that upon vertical movement of said operating shaft, said bearing block is caused to move vertically; and (g) a control for controlling the linear actuators and thereby the positions of each of said bearing blocks to selectively position said pallet assembly.

2. An apparatus for movably supporting a patient in an emergency medical system interiorly disposed in a helicopter comprising:

(a) first and second upwardly extending elongated mounts for restraining horizontal movement of bearing blocks received thereon, said mounts having two ends and a tubular shape and are mounted vertically to an interior wall of a helicopter by a bracket at each end;

(b) a first bearing block slidably received on said first mount and a second bearing block slidably received on said second mount, said bearing blocks cooperating to support a pallet assembly, said bearing blocks being fit in a sealed relationship on said mounts;

(c) a pallet assembly attached to and supported by said first and second bearing blocks;

(d) linear actuators attached to said first and second bearing blocks to move each bearing block along its mount independently of the other bearing block to raise and lower said pallet assembly; and (e) a control for controlling the linear actuators and thereby the positions of each of said bearing blocks to selectively position said pallet assembly.

3. An apparatus for movably supporting a patient in an emergency medical system interiorly disposed in a helicopter comprising:

(a) first and second upwardly extending elongated mounts for restraining horizontal movement of bearing blocks received thereon said mounts having two ends and a tubular shape and are mounted vertically to an interior wall of a helicopter by a bracket at each end;

(b) a first bearing block slidably received on said first mount and second bearing block slidably received on said second mount, said bearing blocks cooperating to support a pallet assembly, said bearing blocks being fit in a sealed relationship on said mounts;

(c) a pallet assembly attached to and supported by said first and second bearing blocks;

(d) linear actuators attached to said first and second bearing blocks to move each bearing block along its mount independently of the other bearing block to raise and lower said pallet assembly, said linear actuators extend and operate parallel to an elongated axis of said tubular mounts; and (e) a control for controlling the linear actuators and thereby the positions of each of said bearing blocks to selectively position said pallet assembly.

* * * * *